Patented Sept. 23, 1941

2,256,806

UNITED STATES PATENT OFFICE 2,256,806

VAT DYE COMPOSITION

Jean G. Kern, East Aurora, N. Y., assignor to National Aniline & Chemical Company, Inc., New York, N. Y., a corporation of New York No Drawing. Application November 28, 1938, Serial No. 242,742

11 Claims. (Cl. 8—70)

The present invention relates to vat dye compositions, especially to vat dye compositions in the form of pastes. More particularly the invention relates to vat dye pastes which contain a vat dye compound in the unreduced form.

A conventional method of printing with vat dyes, e. g., vat dyes of the indigoid and anthraquinone types, involves the use of a printing paste containing the unreduced dyestuff, a reducing agent, such as sodium formaldehyde sulfoxylate, a suitable alkaline material, such as an alkali metal carbonate, together with thickening materials and dispersing agents. The printing paste is usually prepared by mixing a thickener composition containing the thickening materials, the alkaline material, and the reducing agent with the desired proportion of a vat dyestuff paste (which vat dyestuff paste may contain only the vat dye in finely-divided condition and water, but more often also contains a dispersing agent and/or a solvent which has the function of preventing the drying out of the paste).

In the printing of a textile material with a printing paste of the above type, the textile material is brought into contact with the roll of a printing machine to which the printing paste has been applied. The textile material containing the thus applied printing paste is then subjected to a steaming operation whereby the vat dye is reduced by the reducing agent to the leuco form which is relatively soluble in the alkaline mixture. The leuco vat dye has great affinity for fibers composed of or containing cellulosic material, natural silk, or artificial silk, or mixtures of these materials and, on allowing the prints to oxidize, vat dye prints are obtained.

The above-described process is not completely satisfactory since the steaming operation is often ineffective in causing complete reduction of the vat dye in the printing paste applied to the fabric, resulting in the production of specky prints. This is because the unreduced vat dye is not in uniform finely-divided dispersed condition throughout the printing paste, but exists also in the form of large, difficultly reducible particles or agglomerates. The formation of these larger particles is often caused by the drying out of the vat dyestuff pastes employed in the preparation of the printing pastes; a difficulty which heretofore has never been wholly obviated, even when the aqueous vat dyestuff pastes are stored in cool and humid places.

It is a principal object of the present invention to provide new vat dye printing pastes in which the vat dye may be easily and substantially completely reduced, yielding prints which are free from speckiness and of great brilliancy.

Other objects of the invention are to provide vat dye printing pastes which effect substantially complete utilization of the vat dyes incorporated therein and which insure superior penetration of the dyestuff into the fiber.

Another object of the invention is to provide vat dye printing pastes which, upon being printed upon textile materials in the usual manner, are productive of uniform prints.

Another object of the invention is to provide new vat dyestuff pastes which do not dry out easily and when employed in the preparation of vat dye printing pastes or dye baths are effective in producing printing pastes and dye baths in which the dyestuff is uniformly dispersed.

A further object of the invention is to provide vat dye powders excellently adapted for use in the production of printing pastes and dye baths.

Other objects of the invention will in part be obvious and will in part appear hereinafter.

The present invention is based upon the discovery that certain hydroxylated aliphatic polyamines which are described more fully hereinafter possess properties which make them unusually valuable assistance for use in vat dye compositions, particularly vat dye compositions in the form of pastes. Thus, it has been found that if one or more of the hydroxylated aliphatic polyamines are mixed with an aqueous paste of a vat dye containing only the dye and water, or in addition to these materials a dispersing agent or other assistant, a valuable vat dyestuff paste is obtained which may be employed in dyeing but is particularly adapted for use in the preparation of printing pastes or padding baths. The vat dyestuff paste can be dried to form a vat dye powder which is also adapted for use in the making up of printing pastes or padding baths. The hydroxylated aliphatic polyamines may also be incorporated with the other ingredients making up a vat dye printing paste at the time such paste is prepared. The invention includes the vat dyestuff pastes and powders, the printing pastes, and other vat dye compositions containing the hydroxylated aliphatic polyamines described below. The invention also includes processes of printing employing the vat dye printing pastes of the invention.

The hydroxylated aliphatic polyamines which can be used in the vat dye compositions of the present invention are aliphatic amino compounds containing a plurality of amino groups and at least one hydroxyl group. The central aliphatic radical of the polyamines may be a chain or cyclic alkyl radical. The amino groups of these polyamines may be unsubstituted or may contain alkyl radicals or aralkyl radicals as substituents. As employed in this specification and claims the term "alkyl radicals" denotes and includes chain and cyclic alkyl radicals. The hydroxyl group or groups of the compounds may be in the central aliphatic radical thereof or may be in an N-alkyl radical or radicals. Where the central aliphatic radical is free from hydroxyl groups at least one and preferably two or more of the substituents of the amino groups are hydroxyalkyl radicals containing a maximum of three hydroxyl groups.

Thus, the polyamines which may be used in the vat dye compositions may be represented by the general formula:

$$\begin{matrix} X_1 \\ \phantom{X}\diagdown \\ \phantom{X}N-R-\left(N\begin{matrix}X_3\\ \diagdown\\ X_4\end{matrix}\right)_n \\ X_2 \end{matrix}$$

wherein R represents an alkyl radical (which radical may be an open chain or cyclic alkyl radical and may be unsubstituted or may contain substituents which do not alter the essential characteristics of the compound, such as, for example, hydroxyl, alkoxy, and aralkyloxy groups, etc.); $X_1$, $X_2$, $X_3$, and $X_4$ each represents hydrogen, an alkyl radical, an aralkyl radical, a hydroxyalkyl radical containing a maximum of three hydroxyl groups, or a part of a cyclic radical including R, at least one, and preferably two or more, of the substituents represented by $X_1$, $X_2$, $X_3$, and $X_4$ being a hydroxyalkyl radical of this class when the radical represented by R is free from hydroxyl groups; and $n$ represents a small whole number. It will be understood that the aralkyl substituents of the amino groups of the compounds may themselves contain substituents, especially hydroxyl groups in the alkyl groups thereof. Where the alkyl group of an aralkyl radical is two carbon atoms in length or longer and contains hydroxyl groups, it is regarded as a hydroxyalkyl radical for the purposes of the present invention.

The preferred compounds of the above class are hydroxylated aliphatic diamines represented by the above formula when R of this formula represents an ethylene radical. Further, the more important compounds for use in the vat dye compositions of the invention are those containing one or more, preferably at least two, hydroxyethel radicals as substituents in the amino groups.

It will be readily apparent that there are a large number of compounds included within the scope of the foregoing formula and which may be employed in the preparation of the vat dye compositions of the present invention. Among such compounds may be mentioned the following:

1,2-di-(2'-ethanol-amino-)ethane

HOCH₂CH₂NH—CH₂CH₂—NHCH₂CH₂OH 1,2-bis-(di-2'-ethanol-amino)ethane (HOCH₂CH₂)₂N—CH₂CH₂—N(CH₂CH₂OH)₂

1,2-di-(2',3'-propan-diol-amino-)ethane $$\underset{\text{HOCH}_2\overset{|}{\text{CHCH}_2\text{NH}}-\text{CH}_2\text{CH}_2-\text{NHCH}_2\overset{|}{\text{CHCH}_2\text{OH}}}{\text{OH}\qquad\qquad\qquad\text{OH}}$$

di-(N-butyl-N-ethanolamino-)ethane $$\begin{matrix}C_4H_9\\ \diagdown\\ N-CH_2CH_2-N\\ \diagup\\ HOCH_2CH_2\end{matrix}\begin{matrix}\\ \\ \\ \\ CH_2CH_2OH\end{matrix}$$

1,3-di-(2'-ethanolamino-)-2-propanol

HOCH₂CH₂NH—CH₂CHOHCH₂—NHCH₂CH₂OH 1,3-bis-(di-2'-ethanolamino-)-2-propanol (HOCH₂CH₂)₂N—CH₂CHOHCH₂—N(CH₂CH₂OH)₂

1-(mono-amylamino-)-2-(N-amyl-N-2'-ethanolamine-)ethane $$\begin{matrix}& & C_5H_{11}\\ & & \diagdown\\ C_5H_{11}NH-CH_2CH_2-N\\ & & \diagup\\ & & CH_2CH_2OH\end{matrix}$$

N-1',2'-diamino-propylamino-2-ethanol $$\underset{\text{CH}_3\overset{|}{\text{CHCHNH}}-\text{CH}_2\text{CH}_2\text{OH}}{\text{H}_2\text{N}\phantom{xx}\text{NH}_2}$$

1,2-di-(ethanolamino-)-3-amino-propane

HOCH₂CH₂NH—CH₂
HOCH₂CH₂NH—CH
NH₂—CH₂

1,2,3-tri-(ethanolamino-)propane

HOCH₂CH₂NH—CH₂
HOCH₂CH₂NH—CH
HOCH₂CH₂NH—CH₂ tri-(mono-methyl-amino-methyl-)ethanol $$\begin{matrix}CH_3NHCH_2\\ \diagdown\\ CH_3NHCH_2-CCH_2OH\\ \diagup\\ CH_3NHCH_2\end{matrix}$$

tri-(di-methyl-amino-methyl-)ethanol $$\begin{matrix}(CH_3)_2NCH_2\\ \diagdown\\ (CH_3)_2NCH_2-CCH_2OH\\ \diagup\\ (CH_3)_2NCH_2\end{matrix}$$

1-para-hydroxy-benzyl-amino-2-di-(hydroxyethylamino-)ethane

HO—⟨⟩—CH₂NH—CH₂CH₂—N(CH₂CH₂OH)₂

1,2-di-(4'-cyclohexanol-amino-)ethane $$\begin{matrix}CH_2-CH_2 & & & & CH_2-CH_2\\ \diagup\phantom{xx}\diagdown & & & & \diagup\phantom{xx}\diagdown\\ HO-CH\phantom{xx}HC-NH-CH_2CH_2-NH-CH\phantom{xx}HC-OH\\ \diagdown\phantom{xx}\diagup & & & & \diagdown\phantom{xx}\diagup\\ CH_2-CH_2 & & & & CH_2-CH_2\end{matrix}$$

1,2-di-(N-hydroxycyclohexyl-N-ethylamino-)ethane $$\begin{matrix}HOC_6H_{10} & & & & C_6H_{10}OH\\ \diagdown & & & & \diagup\\ & N-CH_2CH_2-N\\ \diagup & & & & \diagdown\\ H_5C_2 & & & & C_2H_5\end{matrix}$$

1-para-hydroxybenzylamino-2-hydroxyethylamino-ethane

HO—⟨⟩—CH₂NH—CH₂CH₂—NHCH₂CH₂OH 1,2-di-(N-cyclohexyl-N-hydroxy-ethylamino-)ethane $$\begin{matrix}C_6H_{11} & & & & C_6H_{11}\\ \diagdown & & & & \diagup\\ & N-CH_2CH_2-N\\ \diagup & & & & \diagdown\\ HOCH_2CH_2 & & & & CH_2CH_2OH\end{matrix}$$

N,N'-diethanol-diethylenediamine, otherwise known as 1.4-diethanol-piperazine $$\begin{matrix} & CH_2-CH_2\\ & \diagup\phantom{xx}\diagdown\\ HOCH_2CH_2N\phantom{xxx}NCH_2CH_2OH\\ & \diagdown\phantom{xx}\diagup\\ & CH_2-CH_2\end{matrix}$$

N,N'-di-(propandiol-2,3)-diethylenediamine, otherwise known as 1.4-di(propandiol-2,3)-piperazine $$\begin{matrix}OH & CH_2-CH_2 & OH\\ | & \diagup\phantom{xx}\diagdown & |\\ HOCH_2CHCH_2-N\phantom{xxx}N-CH_2CHCH_2OH\\ & \diagdown\phantom{xx}\diagup\\ & CH_2-CH_2\end{matrix}$$

The lower carbon-chain compounds of the above type have low melting points, and are viscous liquids at ordinary temperatures; the viscosity of the compounds increasing with increase in their molecular weight. The high molecular chain compounds, on the other hand, are crystalline or amorphous solids which melt above 50° C. The compounds possess high solubility in water, alcohol, and in most organic solvents. They have a very pronounced basic character, being more basic in character than the mono-alkylol-amines. The new assistants also have intense hydrotropic properties which contribute toward rendering them particularly valuable as vat dye printing assistants.

The hydroxylated aliphatic polyamines may be obtained by any one of several well-known methods; for example, they may be obtained by the action of alkylene oxides upon an aliphatic diamine as disclosed by Knorr, Ber., vol. 35, page 4471, or by condensation of mono- or di-alkylolamines with the poly-halohydrins of poly alcohols.

The vat dyestuff pastes of the present invention can be prepared, in accordance with one manner of proceeding, by incorporating with the aqueous press cake of a vat dyestuff obtained in the course of its manufacture one or more of the hydroxylated aliphatic polyamines in liquid or molten form, or in solution in appropriate solvents. It is generally desirable, however, to include in the vat dyestuff pastes, in addition to the press cake and the hydroxylated aliphatic polyamine, a dispersing agent such as, for example, the sulfonic acids of benzene, hydroxybenzene, naphthalene, and aldehyde condensation products thereof (e. g., Leukanol which is said to be a condensation product of formaldehyde and a sulfonated derivative of naphthalene or a sulfonated condensation product of formaldehyde and naphthalene), alkyl-aryl sulfonates, higher alkyl sulfates or sulfonates, and the like, and/or a water substitute, such as glycerine, ethylene glycol, diethylene glycol, or triethylene glycol, etc. An advantageous manner of preparing vat dyestuff pastes of the present invention is to incorporate one or more of the hydroxyalkylated polyamines hereinbefore described with a vat dyestuff paste which already contains the aforesaid additional materials. As already indicated, the vat dye powders of the invention may be prepared in a simple manner by drying the vat dye color pastes.

The vat dye printing pastes of the invention may be conveniently prepared by either of two methods. In accordance with one method they are prepared by merely mixing a vat dyestuff paste of the type described above, containing one or more of the hydroxylated aliphatic polyamines, with the ordinary materials (i. e., a thickener, an alkaline material, and a reducing agent, such as sodium formaldehyde sulfoxylate) which are usually added to vat dyestuff pastes to make up vat dye printing pastes. The vat dye printing pastes may also be prepared by mixing one or more of the hydroxylated aliphatic polyamines with the said ingredients which are usually added to a vat dyestuff paste to prepare therefrom the corresponding vat dye printing paste. In this case it is preferable to employ as a starting material a conventional vat dyestuff paste which contains a dispersing agent and/or a water substitute and/or other suitable additions in combination with the aqueous press cake of the vat dye. The vat dye printing pastes may also be prepared in accordance with this general method by starting with an aqueous press cake of the vat dye and incorporating with the press cake the usual materials present in a printing paste except that there is also included in place of part of the alkaline material and/or the dispersing agent and/or the water substitute, a desirable proportion of one or more of the hydroxylated aliphatic polyamines.

It will be understood that the proportions of the assistants to be employed in the preparation of the pastes can be varied according to the character of the dyestuff employed, and the other ingredients included in the paste. If desired, the whole or any part of the liquid phase of one of the new vat dyestuff compositions of the present invention may consist of the hydroxylated polyamines herein described; and in corresponding vat dyestuff printing pastes the amount of hydroxylated polyamines may be as high as about 15 per cent by weight. Accordingly, the particular amount of hydroxylated polyamine to be used in any given case may be left largely to the discretion of the operator.

The inclusion in the new vat dyestuff compositions of the hydroxylated aliphatic ployamines does not exclude therefrom other ingredients which are used as aids in vat dyestuff compositions, and therefore they may also contain other ingredients such as catalysts, boosters, and textile assistants, as, for example, heavy metal salts, alkylol-monoamines, and printing assistants such as are disclosed in my United States Patents Nos. 2,067,926, 2,067,928, 2,074,150, and 2,145,193.

The new vat dyestuff pastes and the printing pastes made therewith vary in consistency and may be fluid to viscous liquids or semi-solids. They are of high tinctorial strength. The pastes retain their liquid constituents and do not harden or form dry crusts upon exposure to the atmosphere. Thus, the vat dyestuff pastes of the invention are smooth and contain the dye in a finely-divided and well-dispersed form. Because the pastes do not dry out on standing, the formation of difficultly reducible agglomerates of vat dye particles is avoided. Hence, the vat dyestuff pastes may be easily and quickly incorporated in printing pastes to produce smooth printing pastes in which the vat dye is evenly dispersed.

As before stated, the vat dyestuff pastes and powders may be used in the preparation of dye baths of various types for the coloring of textile materials, such as the dye baths of my copending application Serial No. 242,744, filed of even date herewith, but are particularly valuable when employed in the preparation of the vat dye printing pastes of the present invention.

Vat dye printing pastes containing the hydroxylated aliphatic polyamines are exceptionally smooth in character. The hydroxylated aliphatic polyamines have a pronounced binding power, thus improving the properties of the printing pastes. Also, the presence of these assistants in vat dye printing pastes induces greater solubility of the leuco forms of the vat dyes in the pastes and thereby causes better penetration and fixation of the dyes. As a result, the fastness to rubbing of the printed goods is increased and the brilliance of the shades of the prints is enhanced. A further advantage noticed in connection with the use of the printing pastes of the present invention is the fact that the ground shade or the white ground of the printed material is left substantially clean.

It has further been found that by employing the above hydroxylated aliphatic polyamines in the preparation of vat dye color pastes and vat dye printing pastes containing vat dyes with which satisfactory results are ordinarily not obtained, such pastes are productive of entirely satisfactory dyeings and prints. For example, vat dye pastes containing the new assistants and an anthraquinone vat dye yield uniform results under varying aging conditions, results ordinarily not obtainable with conventional commercial anthraquinone vat dye pastes. Furthermore, the shades imparted by mixtures of certain vat dyes which usually produce uneven shades are more uniform when used in printing pastes containing the new assistants of the present invention. A particular result which may be obtained is the achievement of intense and fast vat blacks, ordinarily difficult of achievement, by employing the new assistants in vat dye pastes or printing pastes containing the desired dyes. Also, with compositions which are made according to the present invention, it is possible to obtain the full value of halogenated indanthrene printing colors.

In order that the invention may be more fully understood, reference should be had to the following specific example in which is described the preparation and use of a printing paste containing an anthraquinone vat dye and the new assistants of the present invention. The parts are by weight:

EXAMPLE 1—*Part 1*.—A standard thickener is prepared as follows:

| | Parts |
|---|---|
| Corn starch | 100 |
| British gum | 300 |
| Gum tragacanth 5% | 100 |
| Water | 500 |
| | 1000 |

These are well mixed together and boiled thoroughly to a smooth paste.

To 520 parts of the above standard thickening paste, 170 parts of potassium carbonate are added and about 60 parts water, and heat applied to boil until the whole forms a homogeneous paste which is then left to cool at about 70° C., after which 140 parts of sodium formaldehyde sulfoxylate, 50 parts glycerine, and 60 parts water are added.

A blue vat dye printing paste is made up by adding 200 parts of Carbanthrene Blue GCD double paste (C. I. No. 1113), which contains 16½ per cent of dye solids and 1 per cent of Leukanol, to 675 parts of the above thickening after which 125 parts of 1,2-di-(2'-ethanol-amino-)ethane are added, and these ingredients are mixed until the printing paste is quite smooth.

*Part 2*.—Cotton or rayon cloth is printed with this vat dye printing paste by means of a rotary intaglio printing machine. Thereafter, the material is dried and aged for five minutes in air-free saturated steam at 100° C., and is then rinsed in cold water, soaped at the boil, rinsed and dried. The cloth thus treated contains thereon in selected areas prints of a dark shade of blue of better brilliancy and depth than prints obtained under similar conditions with a printing paste from which the above assistant has been omitted.

Weaker shades of this blue may be obtained by diluting the blue vat dye printing paste with a paste which is designed for such dilutions and which contains, for example, 600 parts of the foregoing standard thickener and 230 parts of water in which 80 parts of potassium carbonate, 60 parts of sodium formaldehyde sulfoxylate, and 30 parts of glycerine have been dissolved.

Instead of employing Carbanthrene Blue GCD double paste in the foregoing example, improved results also may be obtained with the use of an equal amount of the vat dye powder prepared according to Example 9 of my United States Patent 2,067,926 comprising in dry solid form a mixture of the above dyestuff, Leukanol, isobutyl sodium sulfate, and urea.

The assistant, 1,2-di-(2'-ethanol-amino-)-ethane, employed in the above example may be prepared by condensing two mols of monoethanolamine with one mol of ethylene dichloride, and has the following probable formula:

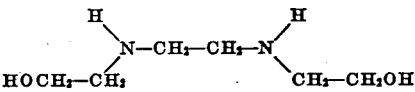

Printing pastes producing prints of a similar quality may be obtained by using other vat dyes in place of Carbanthrene Blue GCD of the above example. In particular, vat dyes of the anthraquinone type, for example, those dyes known as indanthrene vat dyes, and dyes of the halogenated violanthrone and benzanthrone series may be used in this connection. As examples of such dyes may be mentioned the following:

| | Color Index No. |
|---|---|
| Carbanthrene Yellow G double powder | 1118 |
| Carbanthrene Golden Orange 2RT powder | 1097 |
| Carbanthrene Golden Orange G double powder | 1096 |
| Carbanthrene Blue Green FFB double powder | 1173 |
| Carbanthrene Violet 2R powder | 1104 |
| Carbanthrene Dark Blue DR | 1099 |
| Carbanthrene Flavine GC double powder | 1095 |
| Carbanthrene Red Violet 2RNX powder | 1161 |
| Carbanthrene Brilliant Green supra | 1101 |

There may also be employed the bases for vat blacks derived from benzanthrone which has been nitrated, chlorinated, and/or reduced, and mixtures of these dyes which are made to produce all intermediate shades; for example, browns, navy blues, blacks, etc.

In the preparation of a vat dye printing paste in accordance with the procedure of the above example, the dye is preferably employed in the form of a dispersed vat dye paste or powder which contains dispersing agents and/or other assistants.

The following example illustrates a method for the preparation and use of a vat dye printing paste in accordance with the present invention in which a dyestuff of the indigoid series is employed. The parts are by weight:

EXAMPLE 2—*Part 1*.—520 parts of the standard thickener described in Example 1 are mixed with 150 parts of potassium carbonate and 100 parts of water, and heat is applied to the mixture until it is a smooth paste. Thereafter, the paste is cooled down to about 70° C., whereupon 120 parts of sodium formaldehyde sulfoxylate, 50 parts of glycerine, and 60 parts of water are added. A vat dye printing paste for orange prints is then made up as follows: 200 parts of National Vat Orange R printing paste (C. I. No. 1217), which contains 12½ per cent thioindigo dyestuff and 87½ per cent liquid phase free from polyamines, are mixed intimately into 740 parts of the above thickener and 60 parts of di-(N- butyl-N-ethanol-amino-)ethane are then added.

Part 2.—Rayon materials are printed with the printing paste of part 1 of this example by the usual methods, the prints being dried and passed for four minutes through an air-free ager, then through an aqueous oxidizing bath maintained at 140° C. and containing ¼ per cent of sodium bichromate and ½ per cent of acetic acid. The materials are then rinsed, soaped at the boil, rinsed and dried. The resulting print is well penetrated with a brilliant shade which has greater depth than that of a similar print obtained from a vat dye printing paste from which the di-(N-butyl-N-ethanol-amino-)-ethane has been omitted.

In a similar manner, weaker shades may be obtained by diluting the orange vat dye printing paste of this example with a diluting paste which is prepared, for example, from 600 parts of the standard thickener described in Example 1, 70 parts of potassium carbonate, 40 parts of sodium formaldehyde sulfoxylate, and 30 parts of glycerine, dissolved in 260 parts of water.

Vat dye printing pastes may be prepared in a manner similar to that described in Example 2 by using in place of the orange vat dyestuff of the example, other vat dyes, and particularly vat dyes of the indigoid or thioindigoid series, such as, for example,

| | Color index No. |
|---|---|
| Brilliant Indigo 4G powder | 1189 |
| Brilliant Indigo 4B powder (tetrabrom indigo) Vat Scarlet G paste | 1228 |
| Vat Brown G paste (di-Naphthylthioindigo) Vat Violet R paste | 1222 |
| Vat Green G paste | 1199 |

Vat dye printing pastes of valuable properties may be prepared in an analogous manner by replacing the di(N-butyl-N-ethanolamino-)ethane by other aliphatic polyamines of the class above disclosed; for example, one or a mixture of those specifically mentioned. It is to be understood that the various proportions set forth in the foregoing examples may be varied widely, depending upon the material and dye employed and the shade desired. It has been found, however, that where a standardized vat dyestuff paste of the usual type is used in the preparation of a completed printing paste, the amount of assistant ordinarily should not be reduced below about 5 per cent based on the weight of the standardized vat dyestuff paste. In cases where a printing paste contains about 20 per cent of a standardized vat dyestuff paste, the amount of assistant preferably should be adjusted at about 5 per cent to 13 per cent of the weight of the printing paste.

As already pointed out, vat dyestuff pastes and vat dye printing compositions may be prepared in accordance with the present invention by incorporating one or a mixture of the hydroxylated aliphatic polyamines which are employed as assistants in the present invention with an aqueous press cake of a vat dye which may or may not be combined with dispersing agents, water substitutes, and/or other suitable additions. The following examples are illustrative of particular methods of practicing the invention in accordance with this manner of procedure. The examples refer to the utilization of the vat dyestuff pastes in the manufacture of vat dye printing pastes. It is to be understood, however, that the vat dyestuff pastes, while of particular value in the manufacture of vat dye printing pastes, may also be employed in the preparation of vat dye baths of various types. The parts are by weight.

Example 3.—The dyestuff paste as produced in the course of manufacture of Carbanthrene Blue GCD (C. I. No. 1113) is converted into a press cake containing about 70 per cent water and about 30 per cent solids as dry vat dye. 400 parts by weight of the press cake are then intimately mixed with 600 parts of an aqueous paste of the new assistant obtained by adding 100 parts of water to 500 parts of 1,2-di-(2'-ethanolamino-)-ethane until a smooth homogeneous paste is obtained.

200 parts of the Carbanthrene Blue GCD paste thus prepared may be used in place of the 200 parts of Carbanthrene Blue GCD double paste in Example 1, and produces prints similar to those obtained in that example. Also, the paste of this example may be used in the preparation of a printing paste by mixing it with the usual ingredients employed in making up such pastes, without adding a hydroxylated aliphatic amine.

The quantities of the materials employed in the preparation of vat dye pastes in accordance with the above example may be varied considerably without losing the advantages of the present invention. Thus, a paste made by mixing 400 parts of a press cake which contains 30 per cent solids as vat dye and a solution of 400 parts of 1,2-di(2'-ethanol-amino-)ethane and 200 parts of water is superior to the commercial aqueous pastes of vat dyes now available, but is not quite as efficient as a paste prepared in accordance with the above Example 3.

Example 4.—1000 parts of Carbanthrene Blue GCD aqueous paste containing 17½ per cent total dye solids and 1½ per cent Leukanol are mixed with 500 parts of di-(N-butyl-N-ethanolamino-)-ethane into a homogeneous paste which is then evaporated until its weight is reduced to 1000 parts. A very smooth vat dye paste is thus obtained which shows the same improved characteristics as the paste obtained in the previous Example 3.

Example 5.—500 parts of a press cake of Carbanthrene Violet 2R (C. I. No. 1104) containing 80 per cent water and 20 per cent dry dye are mixed with 1 per cent of a dispersing agent (Leukanol 30 per cent solution) and 490 parts of 1,3-bis(di-2'-ethanol-amino)-2-propanol. This vat dye paste may be made up into a printing paste which possesses remarkable printing qualities inasmuch as it surpasses, in printing strength and penetrating qualities, conventional commercial printing pastes.

Vat dye pastes of similar properties may be prepared by using other vat dyestuffs, and others of the class of hydroxylated aliphatic polyamines above described, for example, the dyes and amines hereinbefore specifically disclosed, in place of the vat dyestuffs and hydroxylated aliphatic polyamines incorporated in the vat dyestuff pastes illustrated in Examples 3 to 5. While, as has already been indicated, the quantity of the hydroxylated aliphatic polyamine to be used in the preparation of the vat dyestuff pastes cannot be exactly fixed because it is dependent upon a number of variable factors, to get best results with respect to stability and dyeings in heavy as well as weak shades, it has been found, in general, that the quantity of the assistant should not be reduced below 30 per cent of the total weight of the final vat dyestuff paste. As noted above, the assistant may constitute the entire liquid phase of the pastes. To produce vat dye powders adapted for use in the production of vat dye baths or printing pastes, the vat dyestuff pastes may be dried. Thus, the vat dye powders may contain a vat dye and one or more of the hydroxylated aliphatic polyamines with or without dispersing agents and/or other suitable additions.

As appears from the above description, the vat dye compositions preferably comprise the vat dye in the unreduced form. However, vat dye compositions in which the vat dye is in the free leuco form or in the form of a soluble metal salt thereof are also included in the invention.

Since numerous changes may be made in the compositions and processes above described without departing from the scope of the invention, the above description is to be interpreted as illustrative and not in a limiting sense.

I claim:

1. A vat dye composition comprising a vat dye and a hydroxylated aliphatic polyamine of the following general formula:

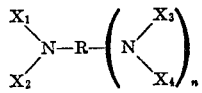

wherein R represents an alkyl radical, $X_1$, $X_2$, $X_3$, and $X_4$ each represents a member selected from the group consisting of hydrogen, alkyl radicals, an ethylene radical formed by $X_1$ and $X_3$ together when R is an ethylene radical and $n$ is 1, aralkyl radicals, and hydroxyalkyl radicals containing a maximum of three hydroxyl groups, at least one of the substituents represented by $X_1$, $X_2$, $X_3$, and $X_4$ being a hydroxyalkyl radical of said class when the radical represented by R is free from hydroxyl groups; and $n$ represents a whole number not greater than 2.

2. A vat dye paste comprising a vat dye, a dispersing agent, and a hydroxylated aliphatic polyamine of the following general formula:

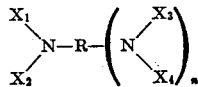

wherein R represents an alkyl radical, $X_1$, $X_2$, $X_3$, and $X_4$ each represents a member selected from the group consisting of hydrogen, alkyl radicals, an ethylene radical formed by $X_1$ and $X_3$ together when R is an ethylene radical and $n$ is 1, aralkyl radicals, and hydroxyalkyl radicals containing a maximum of three hydroxyl groups, at least one of the substituents represented by $X_1$, $X_2$, $X_3$, and $X_4$ being a hydroxyalkyl radical of said class when the radical represented by R is free from hydroxyl groups; and $n$ represents a whole number not greater than 2.

3. A vat dye composition for direct application to textile fibers comprising an unreduced vat dye, a thickener, water, and a hydroxylated aliphatic polyamine of the following general formula:

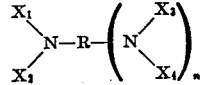

wherein R represents an alkyl radical, $X_1$, $X_2$, $X_3$, and $X_4$ each represents a member selected from the group consisting of hydrogen, alkyl radicals, an ethylene radical formed by $X_1$ and $X_3$ together when R is an ethylene radical and $n$ is 1, aralkyl radicals, and hydroxyalkyl radicals containing a maximum of three hydroxyl groups, at least one of the substituents represented by $X_1$, $X_2$, $X_3$, and $X_4$ being a hydroxyalkyl radical of said class when the radical represented by R is free from hydroxyl groups; and $n$ represents a whole number not greater than 2.

4. A vat dye composition comprising a vat dye and a hydroxylated aliphatic diamine containing at least one N-hydroxyalkyl radical, said diamine being free from hydroxyalkyl radicals containing more than three hydroxyl groups and free from N-substituents other than alkyl radicals, aralkyl radicals and their hydroxy derivatives.

5. A vat dye printing paste comprising an unreduced vat dye, a thickener, water, a reducing agent, and a hydroxylated aliphatic diamine containing at least one N-hydroxyalkyl radical, said diamine being free from hydroxyalkyl radicals containing more than three hydroxyl groups and free from N-substituents other than alkyl radicals, aralkyl radicals and their hydroxy derivatives.

6. A vat dye composition in paste form comprising an unreduced vat dye, water, and a hydroxylated aliphatic diamine containing at least one N-hydroxyalkyl radical, said diamine being free from hydroxyalkyl radicals containing more than three hydroxyl groups and free from N-substituents other than alkyl radicals, aralkyl radicals and their hydroxy derivatives.

7. A process of coloring textile fibers by the printing method which comprises applying to said fibers a vat dye printing paste comprising an unreduced vat dye, a reducing agent, a thickener, water, and a hydroxylated aliphatic polyamine of the following general formula:

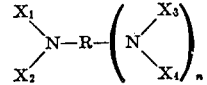

wherein R represents an alkyl radical; $X_1$, $X_2$, $X_3$ and $X_4$ each represents a member selected from the group consisting of hydrogen, alkyl radicals, an ethylene radical formed by $X_1$ and $X_3$ together when R is an ethylene radical and $n$ is 1, aralkyl radicals, and hydroxyalkyl radicals containing a maximum of three hydroxyl groups, at least one of the substituents represented by $X_1$, $X_2$, $X_3$, and $X_4$ being hydroxyalkyl radicals of said class when the radical represented by R is free from hydroxyl groups, and $n$ represents a whole number not greater than 2.

8. A process of coloring textile fibers by the printing method which comprises applying to said fibers a vat dye printing paste comprising an unreduced vat dye, a reducing agent, a thickener, water, and a hydroxylated aliphatic diamine containing at least one N-hydroxyalkyl radical, said diamine being free from hydroxyalkyl radicals containing more than three hydroxyl groups and free from N-substituents other than alkyl radicals, aralkyl radicals and their hydroxy derivatives.

9. A vat dye composition comprising a vat dye and 1,2-di-(2'-ethanol-amino-)ethane.

10. A vat dye composition comprising a vat dye and 1,2-di-(2'3'-propan-diol-amino-)-ethane.

11. A vat dye composition comprising a vat dye and 1,3-bis(di-2'-ethanol-amino)-2-propanol.

JEAN G. KERN.